Sept. 8, 1959

R. E. FERGUSON 2,903,030

ROUTER PLANE

Filed May 1, 1956

Robert E. Ferguson
INVENTOR.

BY *Clarence A. O'Brien*
*and Harvey B. Jacobson*
Attorneys

United States Patent Office 2,903,030
Patented Sept. 8, 1959

2,903,030
ROUTER PLANE
Robert E. Ferguson, Denton, Tex.

Application May 1, 1956, Serial No. 581,902

1 Claim. (Cl. 145—10)

The present invention relates to new and useful improvements in router planes for carpenters and has for its primary object to provide, in a manner as hereinafter set forth, a tool of this character which is particularly adapted to prepare doors for the installation of hinges, lock faces and other hardware.

Another very important object of the invention is to provide a router plane of the aforementioned character comprising novel means for frictionally clamping the adjustable and removable bit in the stock.

Other objects of the invention are to provide a router plane of the character set forth which will be comparatively simple in construction, strong, durable, highly efficient and reliable in use, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

through the device; and

Figure 4:
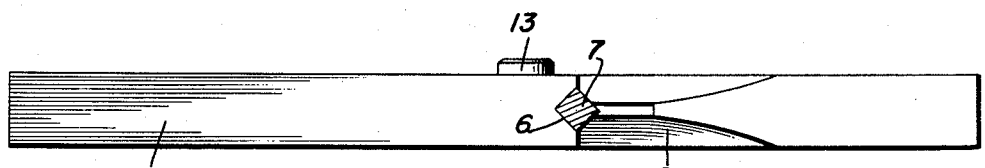

Figure 4 is a bottom plan view, showing the bit in horizontal section.

Referring now to the drawing in detail, it will be seen that the embodiment of the invention which has been illustrated comprises a stock 5 of suitable dimensions and material. Extending vertically through the stock 5 at an intermediate point is a substantially square opening 6. The opening 6 snugly receives the usual square shank 7 of a bit 8. The lower portion of the stock 5 is recessed, as at 9, to provide clearance for the blade 10 of the bit 8, the recess 9 communicating with the opening 6.

Extending downwardly into the stock 5 from the top to a point adjacent the bottom thereof is a longitudinal, substantially semi-circular or segmental groove or channel 11 which intersects the opening 6. The groove or channel 11 communicates with the recess 9. Threadedly mounted in the walls 12 of the segmental groove or channel 11 is a headed screw 13 for drawing said walls inwardly or toward each other in a manner to frictionally clamp the shank 7 of the adjustable and removable bit 8 therebetween.

Figure 1:
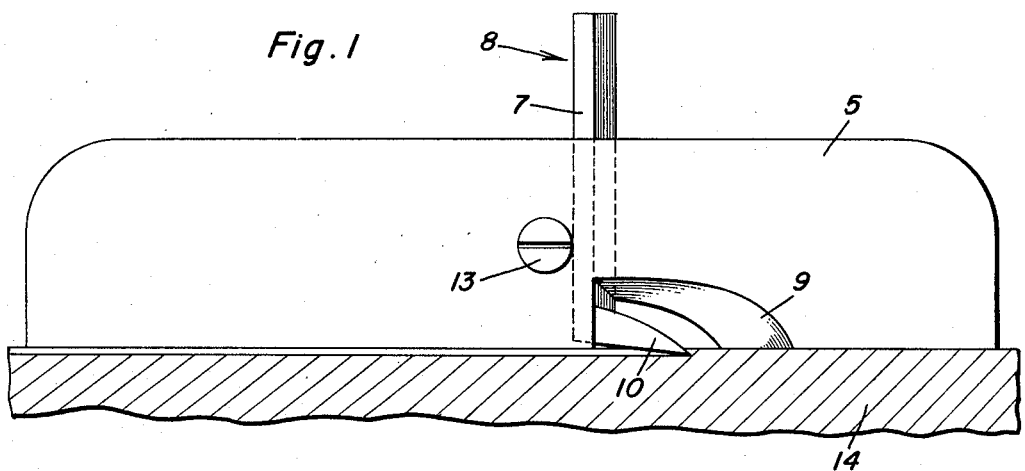
Figure 1 is a view in side elevation of a router plane constructed in accordance with the present invention, showing the device in use, the work being shown in longitudinal section.
Figure 2:
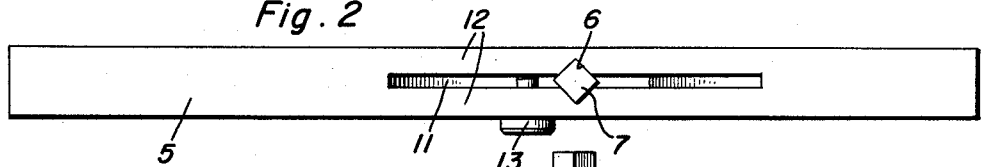
Figure 2 is a top plan view of the plane.
Figure 3:
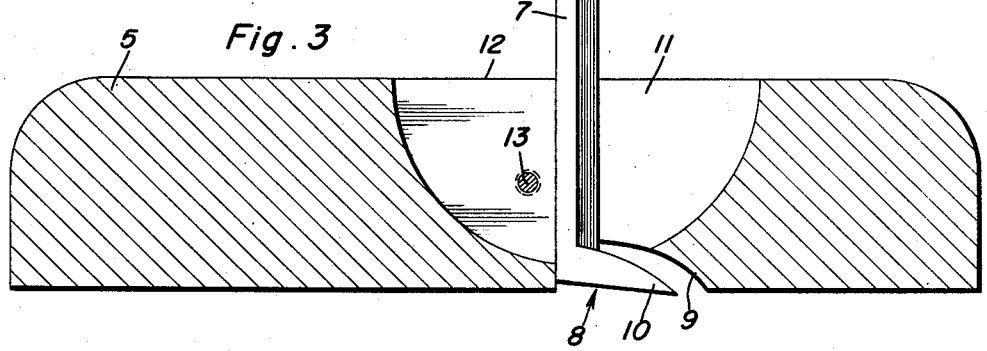

It is thought that the use of the tool will be readily apparent from a consideration of the foregoing. Briefly, the bit 8 is inserted upwardly through the opening 6 and adjusted to the desired position. The adjustment is then expeditiously and firmly secured by simply tightening the screw 13. To change the adjustment when desired or to remove the bit this procedure is, of course, substantially reversed. With the bit 8 secured in adjusted position in the stock 5 the plane is operated in the usual manner. In Figure 1 of the drawing reference character 14 designates a piece of work.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A router plane of the character described comprising: a horizontally elongated stock including a top and a bottom, said stock having a vertical opening therethrough at an intermediate point and further having a substantially segmental longitudinal channel therein extending downwardly thereinto from the top to a point adjacent to but spaced from the bottom thereof and intersecting the opening and defining a pair of opposed, bendable walls, a bit comprising a vertical shank engaged in the opening with its lower end portion abutting the stock between said bottom thereof and the channel, and a screw threadedly mounted transversely in the bendable walls for drawing said walls together for frictionally clamping the shank therebetween.

References Cited in the file of this patent

UNITED STATES PATENTS

| 196,623 | Blum | Oct. 30, 1877 |
| 399,760 | Lewallen | Mar. 19, 1889 |
| 761,097 | McCluer et al. | May 31, 1904 |
| 1,088,209 | Collet | Feb. 24, 1914 |
| 1,536,096 | Haley | May 5, 1925 |

FOREIGN PATENTS

| 45,962 | Sweden | Oct. 24, 1919 |
| 117,826 | Switzerland | Dec. 1, 1926 |
| 394,602 | France | Dec. 1, 1908 |